United States Patent
Scuderi

(12) 
(10) Patent No.: US 6,303,890 B1
(45) Date of Patent: Oct. 16, 2001

(54) METHOD FOR THE CONTROLLED WITHDRAWAL MOVEMENT OF A MACHINING ELECTRODE IN AN EROSION DEVICE

(75) Inventor: Mario Scuderi, Luino (IT)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 09/453,453

(22) Filed: Dec. 3, 1999

(30) Foreign Application Priority Data

Dec. 4, 1998 (DE) ............................................. 198 56 099

(51) Int. Cl.⁷ ................................. B23H 7/18; B23H 7/20
(52) U.S. Cl. ...................................... 219/69.17; 219/69.16
(58) Field of Search ............................. 219/69.16, 69.19, 219/69.17

(56) References Cited

U.S. PATENT DOCUMENTS

| | | | |
|---|---|---|---|
| 4,608,476 | * 8/1986 | Shimizu | 219/69.16 |
| 4,733,040 | 3/1988 | Pelloni et al. | 219/69.16 |
| 4,891,487 | 1/1990 | Nakata | 219/69.16 |
| 4,939,334 | * 7/1990 | Gruber et al. | 219/69.16 |
| 5,051,554 | * 9/1991 | Tsukamoto | 219/69.16 |
| 5,057,554 | 10/1991 | Owens . | |
| 5,064,985 | * 11/1991 | Yoshizawa et al. | 219/69.16 |
| 5,324,908 | * 6/1994 | Masuda et al. | 219/69.16 |
| 5,444,205 | 8/1995 | Lodetti . | |
| 5,852,268 | 12/1998 | Bühler et al. | 219/69.16 |

FOREIGN PATENT DOCUMENTS

| | | |
|---|---|---|
| 35 25 683 A1 | 1/1987 | (DE) . |
| 37 05 475 C2 | 8/1987 | (DE) . |
| 38 17 302 C1 | 5/1988 | (DE) . |
| 40 24 731 A1 | 2/1991 | (DE) . |
| 42 43 392 A1 | 7/1994 | (DE) . |
| 195 16 990 C2 | 11/1996 | (DE) . |
| 56-39830(A) | 8/1979 | (JP) . |
| 62-15023 * | 1/1987 | (JP) ................................... 219/69.19 |
| 4-289026(A) | 3/1991 | (JP) . |

* cited by examiner

Primary Examiner—Geoffrey S. Evans
(74) Attorney, Agent, or Firm—Burns, Doane, Swecker & Mathis, L.L.P.

(57) ABSTRACT

A method and a device for the controlled withdrawal movement of a machining electrode in an erosion device wherein, in the case of a process malfunction, the machining electrode is moved backward along the previously traveled machining path (B) (first way of withdrawal) and along a withdrawal vector (RV) defined in relation to the machining path (B) (second way of withdrawal). In order to quickly eliminate the process malfunction and at the same time reduce the risk that the machining electrode will hit the work piece surfaces during the withdrawal movement, the machining electrode is moved backward simultaneously along both ways of withdrawal, and the direction of the withdrawal vector (RV) at each point is adapted to the previously traveled machining path (B).

15 Claims, 2 Drawing Sheets

METHOD FOR THE CONTROLLED WITHDRAWAL MOVEMENT OF A MACHINING ELECTRODE IN AN EROSION DEVICE

CROSS-REFERENCE TO RELATED APPLICATIONS

The present application corresponds to German Patent Application No. 198 56 099.0, which was filed in Germany on Dec. 4, 1998, and the entire contents of which are hereby incorporated herein by reference.

BACKGROUND OF THE INVENTION

1. Field of the Invention

The invention relates to a method for the controlled withdrawal movement of a machining electrode in an erosion device, and to a corresponding control device for performing this method.

2. Description of Related Art

In DE-PS-35 25 683 a method is disclosed wherein, when a short-circuit occurs, the machining electrode first moves back along the previously traveled machining path by a predefined, short section inside the already eroded path (first way of withdrawal; from hereon also called the "default" way of withdrawal). If, at the end of this first type of withdrawal, the short-circuit has not been corrected yet, the electrode is moved further away from the short-circuit on a second, straight path. This second path is described by a withdrawal sector whose direction and length have been chosen so that the machining electrode is removed from the short-circuit point as quickly as possible (second type of withdrawal).

A method employing only the "default" way of withdrawal is known, for example, from DE-OS 37 05 475 for an electrical arc device. This publication furthermore describes a "point" way of withdrawal in which the electrode is moved towards a point when a short-circuit occurs. This point is hereby adapted to the current machining site, which means, for example, that it follows it into the depth of the tool when the erosion is performed into it.

DE-PS 38 17 302 describes a further development of the above mentioned process in which the electrode is moved first along the first, then along the second, and then along a third way of withdrawal. The third way of withdrawal follows the second type of withdrawal at the time at which the tip of the withdrawal vector is reached. The third way of withdrawal then takes place parallel to the eroded machining path, in an opposite direction. The withdrawal vector for the second way of withdrawal is also defined so as to have a fixed length and direction (from hereon also called the "fixed vector" way of withdrawal.)

The disadvantage of the known withdrawal strategies is that the machining electrodes are removed either only slowly from the short-circuit point in the initial phase, in particular, they are not moved fast enough from the already eroded machining path (for example, with the "default" way of withdrawal), or there is a risk that the electrodes will damage smaller edges created during the withdrawal movement (for example, with the "fixed vector" and "point" types of withdrawal. These edges are created in such a way, for example, that in the case of a short-circuit the electrode erodes the work piece in such a manner that a curvature corresponding to the electrode curvature is created in the work piece. If the machining electrode is removed only slowly from the short-circuit point, the erosion gap also does not significantly increase at the beginning of the withdrawal movement. The erosion particles causing the short-circuit at this point therefore cannot be flushed quickly enough from the narrow erosion gap, so that the short-circuit continues.

In addition, most of these withdrawal strategies show little consideration of the actual progression of the machining path, resulting in undesired collisions of the machining electrode with the processed work piece. This is the case particularly if the machining path has small, localized directional changes that are not detected by any withdrawal vectors.

OBJECTS AND SUMMARY

An object of the present invention is to improve the aforementioned method and device to the effect that process malfunctions are eliminated as quickly as possible, and at the same time the risk that the machining electrode will collide with work piece surfaces during the withdrawal movement is reduced.

According to one aspect of the present invention, the machining electrode is simultaneously moved backward along both ways of withdrawals, and the direction of the withdrawal vector is adapted at each point to the previously traveled machining path. This combined way of withdrawal is also hereinafter called the "tangent vector" way of withdrawal.

It is advantageous that the simultaneous movement along both ways of withdrawal on the one hand causes a quicker removal of the machining electrode from the work piece surfaces, i.e., the short-circuit is eliminated quicker, and that on the other hand the machining electrode is guided along the actual progression of the machining path, i.e., collisions with the work piece surfaces are avoided. The movement component along the first way of withdrawal hereby prevents, in an advantageous manner, the machining electrode from "getting stuck" on the curvatures which are formed due to the electrode form at the erosion site in the machining path. The second way of withdrawal adds a movement component with which the machining electrode is removed from work piece surfaces as quickly as possible. The particles created during the erosion process are able to aggregate in the previously eroded machining path. If the withdrawal movement again takes place along this eroded machining path, there is a risk that these particles are grated into the flanks or the bottom of the machining path and in this way damage the eroded surfaces of the latter. With the help of the invention, this risk is mostly eliminated.

The simultaneous movement therefore optimizes the time required for eliminating the short-circuit and the risk of collision with a work piece surface or damage of the already eroded surfaces.

But this combination effect is best achieved if the withdrawal vector is adapted to each point of the machining path. This is the best way to avoid that, because of the movement component starting immediately with the onset of the withdrawal, a collision with work piece surfaces occurs along the withdrawal vector. Such a collision can be caused in particular by local curvatures in the machining path. The invention now advantageously adapts the withdrawal vector automatically to such curvatures and hereby prevents such a collision.

Such an adaptation can be characterized, for example, in that it considers (only) larger directional changes in the machining path that is being traveled in a backward movement. The adaptation seen in the direction of the machining path that is being traveled in a backward direction also may be performed in an anticipating manner, so that only directional changes expected within a very short or a specific time are being considered. This adaptation may be accomplished with simple or more complicated mathematical calculations, such as a projection of components of the withdrawal vector on the machining path, etc.

BRIEF DESCRIPTION OF THE DRAWINGS

The invention and additional advantages of the invention will now be explained in more detail using preferred exemplary embodiment in reference to the enclosed drawing. In the drawing.

DETAILED DESCRIPTION OF THE PREFERRED EMBODIMENTS

Figure 1:
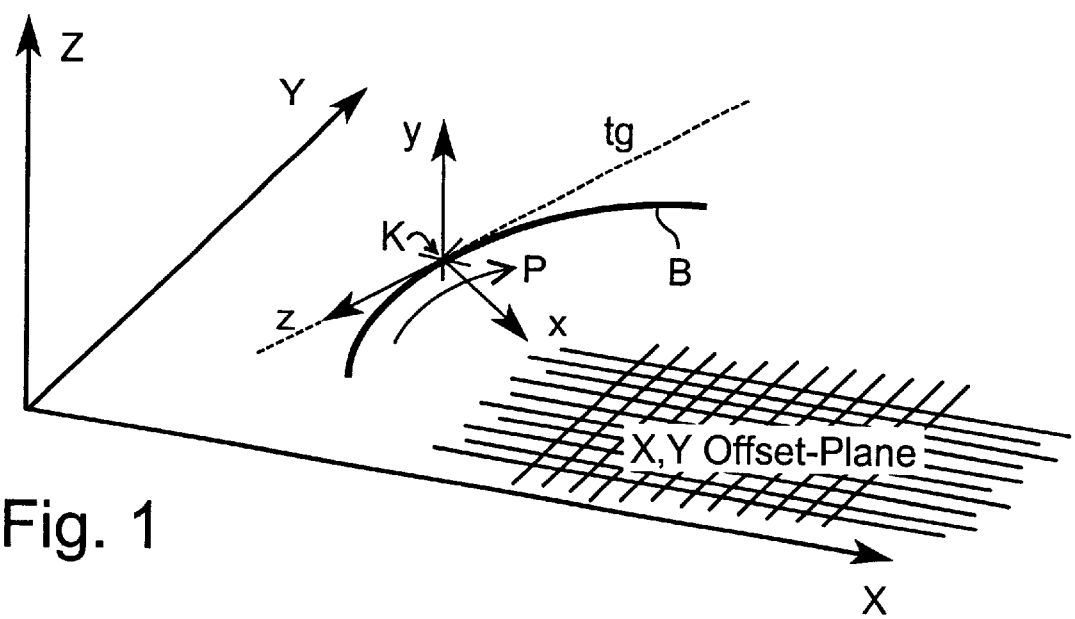
FIG. 1 shows a schematic view of a machining path along with a local coordinate system drawn for a point in the machining path.

The machining electrode used with the present invention may be a sinker electrode or a wire electrode for electrically erosive or electrochemical machining. The sinking erosion may be conventional sinking erosion or micro-sinking erosion.

A process malfunction in the sense of this application means those cases where the electrode must be removed from the last eroded point. This most frequently occurs in the case of a short-circuit, but a withdrawal movement of the machining electrode could also be required because of an unintentional drop in flushing pressure or externally caused, undesired vibrations of the erosion device.

In order to adapt the withdrawal vector, it is preferred that its length and direction are fixed in relation to a local coordinate system, and this coordinate system is adapted locally in such a manner to each point of the machining path that one coordinate axis of the coordinate system is oriented tangentially to this point of the machining path. This creates an adaptation that is especially easy to realize. The operating personnel, for example, must only globally define a withdrawal vector into whose direction a withdrawal movement is principally possible for the machining path. This withdrawal vector is in a particularly simple manner adapted automatically by the control device to local changes in direction of the machining path by simply rotating its coordinate system accordingly. The orientation along the tangent of the point of the machining path is hereby directly related to local curvatures of the machining path.

It is preferred that a second coordinate axis of the local coordinate system is oriented along a normal vector of an offset plane. An offset plane is defined as a user-defined abstract plane associated via the machine controller with the control program. It is essentially defined by the machining coordinate system of the respective machining, more exactly by the plane defined by the x and y coordinate axis of the machining coordinate system. The machining coordinate system can be rotated and shifted as desired. In this way the offset plane takes into account every location and position of the respective machining of the work piece. An offset plane can be associated precisely with each machining. The offset plane is preferably parallel to the plane on which the substantial part of the machining path is located. In other words, the offset plane is fixed so as to provide the control device with certain information about the spatial sector in which the escape path may be located. The normal vector of the offset plane in this way essentially points into the material-free hemisphere.

It is preferred that different withdrawal vectors with a constant length and direction are associated by sections with the machining path. This makes it possible to advantageously adapt the withdrawal vectors to obstacles that are different in different sections. For example, after extreme changes in direction of the machining path, a new withdrawal vector may be necessary.

It is preferred that for the advantageous reduction in time for eliminating the process malfunction before and/or during the withdrawal movement, supplementing measures for eliminating the process malfunction, for example changes in process parameters, such as machining current, frequency, flushing, are performed. It is hereby a particularly advantageous supplementary measure to proactively determine whether a withdrawal movement is even necessary. In respect to such supplementary measures, we refer to publications EP 209 792 A and EP 342 698 A, the disclosures of which are in each case incorporated with their full content into the specification at hand.

It is preferred that a fixed rotation of the electrode in relation to the local coordinate system is determined additionally for the withdrawal vector. In particular for non-rotation-symmetrical electrode forms (for example, prismatic electrode forms), a rotation of the machining electrode is able to further reduce the time required for eliminating the process malfunction or reduce the risk of collision with a work piece surface. The rotation of the machining electrode hereby also can be rotated from its rotation angle at the time the short-circuit occurs, simultaneously with the movements of the machining electrode, along the first and second way of withdrawal to its predefined rotation angle.

The machining electrode is preferably withdrawn at different speeds along the two ways of withdrawal. It is particularly preferred that during the course of the withdrawal movement, the speed of the machining electrode along one or both ways of withdrawal and possibly also the rotation speed of the machining electrode is changed. These measures provide the operating personnel with a number of optimization parameters for optimizing the time required to eliminate the short-circuit, the length of the withdrawal movement, the reduction of a risk of collision and damage to work piece surfaces. The control device could also be able to automatically optimize these optimization parameters in real time, for example, in relation to additional, controlled erosion parameters.

It is preferred that after the process malfunction is eliminated, the machining electrode is moved backward along the traveled withdrawal path to the point where the process malfunction first occurred. This again advantageously prevents a collision of the machining electrode with work piece surfaces on their way to resume the erosion.

It is preferred that the withdrawal movement is followed by one or more of the following ways of withdrawal: default, point, fixed vector. It is especially preferred that the time at which the machining electrode was moved over the entire length of the withdrawal vector is chosen as the onset time for the additional type(s) of withdrawal. The known ways of withdrawal discussed in the introduction of the specification provide a selection of simple to realize ways of withdrawal that are able to define the further progression of the withdrawal movement. With the help of transition sections it is hereby possible to advantageously ensure the continuity of the withdrawal path at the connecting points of the individual, consecutive ways of withdrawal.

It is preferred that various ways of withdrawal are associated with the machining path. For individual sections, one of the known ways of withdrawal may be more advantageous or easier to program. Again, it is automatically possible by means of transitional sections to take into consideration that the continuity of the withdrawal path is ensured at the connecting points of the individual, consecutive ways of withdrawal. Alternatively, the operating personnel could be informed of any possible problems with continuity when the individual ways of withdrawal are established. In respect to the supplementing ways of withdrawal, we refer to publication DE-PS 38 17 303 discussed above, the full content of whose disclosure is incorporated into the specification at hand.

It is preferred that the machining steps required for the tool machining are controlled by a control program, whereby geometrical data and machining parameters are entered separately, and the control program is created by linking the geometrical data with certain machining parameters. In other words, two types of model data are entered for the individual machining steps. For example, a set of geometrical data can be entered which can be selected and repeated for certain model geometry. Then different machining parameters, which again may be combined into groups among each other, can be associated with these individual sections of the model geometry. The geometrical data and machining data are stored and correspondingly administered separately in separate databases. When setting up an erosion device, the operating personnel selects a specific geometry or contour from the "geometry memory" and links it as needed and required with a certain technology from the "parameter memory". This advantageously simplifies the programming for the tool machining. In respect to dividing the machining steps into geometrical data and machining parameters, we refer to publication DE-A 32 28 207, the full content of whose disclosure is incorporated into the specification at hand.

FIG. 1 shows a schematic view of a machining path B along with a local coordinate system drawn for a point K in the machining path B. The machining electrode travels through this machining path B in the direction of the shown arrow P. The machining path B, for example, may be a sinker electrode's guiding path that was defined for a work piece. The machining electrode can be chosen so that the shape to be eroded is created directly by moving, for example, a sinker electrode along the machining path B. This type of erosion is particularly advantageous for molded parts, such as sealing rings.

In principle, a machine coordinate system that describes the orientation of the machine tool is defined for an erosion machine. In this machine coordinate system, a work piece coordinate system is defined that describes the orientation of the work piece in relation to the previous coordinate system. In addition, one or more machining coordinate systems may be defined with respect to various machining sites or sections in relation to the work piece coordinate system.

During the eroding process, the machining electrode erodes small particles from the work piece. Under normal circumstances, these particles are flushed by a liquid flushing agent from the erosion gap. But these particles may also, in some instances, aggregate in such an unfavorable manner between the work piece and the machining electrode that a short-circuit can occur as a process malfunction, whereby the resistance in the dielectric drops towards zero. To eliminate this short-circuit, the machining electrode can be moved in a withdrawal movement away from the point where the short-circuit occurred. In this case, the erosion gap should be enlarged so that the particles causing the short-circuit can be flushed out. In addition, the short-circuit should be eliminated as quickly as possible, as is the case with all withdrawal movements. For this purpose, the machining electrode should, among other things, be removed from any work pieces as quickly as possible.

In principle, the presence of the process malfunction is continuously monitored during the entire withdrawal movement. Also, additional supplementing measures may be taken during the entire withdrawal movement in order to eliminate the process malfunction. In the case of a short-circuit as a process malfunction, for example, the process parameters, such as machining current, frequency, flushing, etc., can be adjusted. Other relevant measures could be implemented for other process malfunctions. The withdrawal movement also can be preceded by a test step that determines whether a withdrawal of the machining electrode is even required.

During the withdrawal movement, obstacles must be taken into consideration however. If such an obstacle restricts, for example, part of the work piece in respect to geometry, it is not always possible to continue the movement of the machining electrode in a fixed direction without restriction, since the machining electrode would otherwise hit the obstacle. To this extent, a withdrawal vector with a fixed length and direction is defined that describes a collision-free withdrawal movement for each point of the machining path. The definition hereby may be created by sections on the machining path B. This withdrawal vector may be determined in advance by the operating personnel and/or the CNC control. It takes into account in particular the environment of the work piece that limits the withdrawal movement. The withdrawal vectors are, for example, defined so that the tip of the withdrawal vector never points towards an obstacle or even reaches into the immediate area around an obstacle which would again create a risk of a short-circuit.

In the case of a sectional definition, the withdrawal vectors in part define parallelograms, the surfaces of which, through clear visualization, must not be allowed to come into contact with obstacles (work piece, clamping means for the work piece, etc.) in order to ensure a collision-free withdrawal movement of the machining electrode.

If the angle of the machining path B should change, for example by 90°, the operating personnel and/or CNC control assuming a constant direction and length of the withdrawal vector will be able to immediately recognize whether this withdrawal vector must be changed in order to retain a reasonably possible withdrawal movement.

The length and direction, and possibly a rotation of the withdrawal vector, are hereby defined for sections of the machining path B in relation to a local coordinate system which may coincide with the machine coordinate system of the erosion device, the work piece coordinate system of the work piece, or machining coordinate systems that were in each case separately defined for sections of the machining path B. In a preferred definition for the machining coordinate systems, each machining coordinate system is oriented in such a way that its z coordinate axis points in the direction of the machining path B. The withdrawal vector defined in each case on this machining coordinate system directly describes the actual withdrawal direction. In a definition of the withdrawal vector for one of the other coordinate systems, a control device-initiated rotation of the withdrawal vector into a coordinate system whose z axis points along the direction of the machining path may be necessary.

Additional means for describing the environment of the work piece or machining path may be used. The geometry, for example, may be mechanically, optically, or otherwise scanned, the CAD model data can be evaluated, etc. As a rule, the environment is unknown, however, and only can be determined with special expenditure. To this extent, it is principally up to the operating personnel to enter the environment, such as obstacles, etc. The environment may be known if the control device has already performed a movement in the environment of the current machining site.

During the withdrawal movement, the local coordinate system is adapted to the local characteristics of the machining path B which was traveled in reverse direction in such a way that the z coordinate axis of the local coordinate system is oriented for each point of the machining path B along the tangent on this point in the direction of the withdrawal movement. Furthermore, the y coordinate of the local coordinate system is oriented in the direction of the normal vector for the offset plane. The orientation of the third x coordinate axis automatically is the normal of the plane defined by the z and y coordinate axis, whose direction is clearly predefined in such a way that a right-handed coordinate system is created. The x coordinate axis therefore points with its positive direction seen in the machining direction P of the machining path B which points in an opposite direction to the withdrawal direction to the right in FIG. 1.

Overall, the x and y components of the withdrawal vector define the distance from the machining path B (path geometry) during the withdrawal movement, while the z component presents the path length of the withdrawal path R that is necessary to travel through the length r of the withdrawal vector.

FIG. 1 shows such a local coordinate system for point K of the machining path B at which the short-circuit occurred. As can be seen from FIG. 1, the z axis points to the tangent at the point K of the machining path B represented by the straight line tg, i.e., in an opposite direction to the machining direction P, while the y coordinate axis stands perpendicular to the offset plane, which in the case shown in FIG. 1, is oriented parallel to the xy work piece plane.

Figure 2:
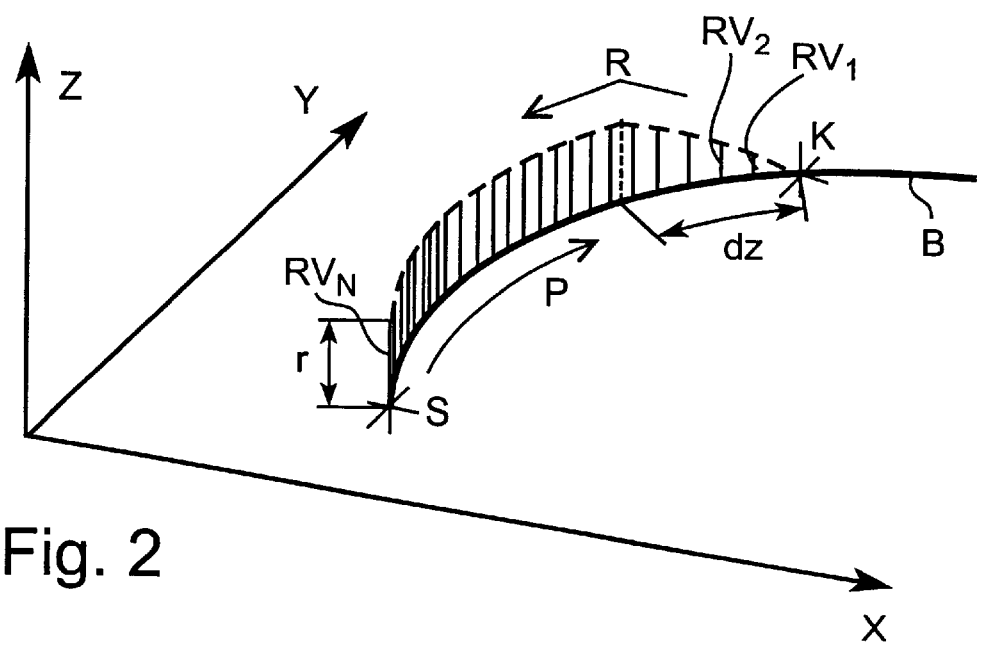
FIG. 2 shows a schematic view of the withdrawal path next to the machining path as well as several withdrawal vectors for constructing the withdrawal path.

FIG. 2 shows a schematic view of the machining path B, the withdrawal path R, and several withdrawal vectors $RV_1$ to $RV_N$ for constructing the withdrawal path R.

The point K again designates the point at which the short-circuit occurred. Now, two movement components are incorporated into the direction of the withdrawal movement. The first component is a reverse movement through the previously eroded machining path B (first type of withdrawal). This movement component causes the machining electrode to be guided in the cycle of the control timer from one point to the next point on the already traveled machining path B. This may be accomplished with discreet steps or quasi-continuously. The local coordinate system is oriented according to the construction principle shown in FIG. 1 for each point of the machining path B through which the machining electrode travels in reverse direction.

The withdrawal vector $RV_1$ to $RV_N$ is fixed in length, direction, and possibly rotation of the machining electrode in relation to the local coordinate system oriented for each point of the machining path B. The index of the directional vector in respect to the work piece coordinate system in each case indicates the change of direction of the withdrawal vector caused by the different orientation of the local coordinate system in respect to the work piece coordinate system.

In the course of the withdrawal movement, the withdrawal movement component is superimposed along the first way of withdrawal by a movement in the direction of the withdrawal vector (second way of withdrawal). By orienting the local coordinate system in respect to the local curvature of the machining path B, the direction of the withdrawal vector $RV_1$ to $RV_N$ is rotated correspondingly. The machining electrode now travels, preferably with the same speed at which it is moved along the first way of withdrawal, simultaneously over the length of the withdrawal vectors $RV_1$ to $RV_N$ which has been adapted for each point of the machining path B in respect to direction.

In other words, the synchronization or time for the withdrawal movement can be selected as a parameter for initializing the two movements along the first (in reverse direction) and along the second (along the withdrawal vector) way of withdrawal. This means that the machining electrode is moved in equal time units in equal step lengths along the reverse direction and along the withdrawal vector.

In some cases it may be advantageous to select the two step lengths with different lengths in order to bring about different speeds in respect to the two movement components.

It may also be advantageous to decrease or increase one or both step lengths during the course of the withdrawal movement, either together or separately, in order to decelerate or accelerate the withdrawal movement overall.

A deceleration may be of advantage if the space available overall for the withdrawal movement is limited, and even short movements of the machining electrode could potentially eliminate the short-circuit. For example, if the erosion gap is obstructed by particles that initially cannot be flushed clear yet, the probability of it being cleared by flushing rises, starting with a certain size of the erosion gap, from this minimum size, even small movements could be adequate. An acceleration could be of advantage if the machining electrode only must be guided with more precision in the beginning in order to prevent a collision with a work piece surface and/or an unintentional eroding. Starting with a certain distance from the short-circuit site, the machining electrode can be "released" to such an extent that the withdrawal movement can be accelerated in order to achieve a faster elimination of the short-circuit.

The machining electrode also may have a momentary rotation angle at the point K. The withdrawal vector $RV_1$ to $RV_N$ now may contain a fixed withdrawal rotation angle, in relation to which the machining electrode should be rotated during the withdrawal movement. During the withdrawal movement, the rotation of the machining electrode from the momentary to the fixed rotation angle hereby also can be initialized in such a way as to also have been rotated to the fixed rotation angle when traveling the entire length of the withdrawal vector $RV_1$ to $RV_N$. It is hereby also possible to provide an acceleration or deceleration of the rotation movement that is either separate or combined with the other two ways of withdrawal. Alternatively, the rotation speed can also be selected so that the rotation is completed either before or only after traveling the entire length of the withdrawal vector $RV_1$ to $RV_N$.

FIG. 2 shows a length section dz, which the machining electrode travels within a specific time in reverse direction through the machining path B. During this specific time, the machining electrode also travels a specific length along the length of the withdrawal vector. In the shown example, the machining electrode has already traveled the entire length of the withdrawal vector $RV_1$ to $RV_N$ after traveling the length dz. The drawn length of the withdrawal vectors $RV_1$ to $RV_2$ indicates in each case the length which the machining electrode has traveled when simultaneously traveling backward through the corresponding machining path along the direction of the respective withdrawal vector $RV_1$, $RV_2$.

This means that at the end of the length dz, the machining electrode already has traveled the entire length r of the withdrawal vector $RV_1$ to $RV_N$ so that during the further course of the withdrawal movement the withdrawal path extends only parallel to the already eroded machining path. In this case, no further movement along the second way of withdrawal (along the withdrawal vector $RV_1$ to $RV_N$) takes place.

Figure 3:
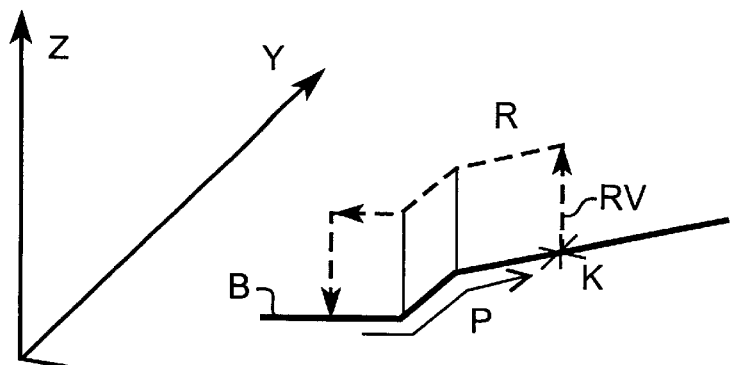
FIG. 3 shows a schematic view of a known "fixed vector" way of withdrawal.

In the known example shown in FIG. 3, the machining path B traveling in a reverse direction is located completely in the XY plane of the work piece coordinate system. The withdrawal vector $RV_1$ to $RV_N$ also has been chosen for this example so that it has no component in the z direction in the local coordinate system, but has only components in the x and y direction. Because of this, the withdrawal vector $RV_1$ to $RV_N$ is also not rotated any further in the space from point to point of the machining path B traveling in a reverse direction and therefore always points in the direction of the z axis of the work piece coordinate system. The y axis of the local coordinate system indeed rotates from point to point, but the withdrawal vector $RV_1$ to $RV_N$ does not, since it, after all, does not have any component in the z direction. But this is only a special case that was selected in order to make it easier to understand the invention for demonstration purposes.

In the example shown in FIG. 2, the withdrawal movement is complete for the withdrawal vector $RV_N$ at point S of the machining path B traveling in a reverse direction.

The length dz may, however, also be followed by other known ways of withdrawal, for example, by the withdrawal strategies "fixed vector", "default", and "point" explained below in reference to FIGS. 3 to 5.

The connection can be made with the help of a transitional section that ensures a constant transition between the individual ways of withdrawal. Overall, today's control devices have such high processing power that all calculations can be made without problems during the withdrawal movement With some forms of electrodes, it may be advantageous that the machining electrode is initially moved only a short distance in the reverse direction until the movement component is added along the withdrawal vector. This makes it possible to prevent contours that were eroded by the machining electrode from being changed during the withdrawal movement.

The individual ways of withdrawal or their combinations also can be automatically selected in advance by the operating personnel or during the withdrawal movement by the control device in relation to the respective local geometry of the machining path, the flushing conditions, machining quality, etc. This is also true for the types of withdrawals or their combinations associated with the individual sections of the machining path B.

For example, given a combination of the "tangent vector" and "fixed vector" ways of withdrawal, a linear connection can be made between the tips of both withdrawal vectors.

FIG. 3 shows a schematic view of a known "fixed vector" way of withdrawal. In the shown coordinate system, a machining path B can be seen. Arrow P indicates the machining direction. A short-circuit occurs, for example, at point K of the machining path B. A withdrawal vector RV with a fixed length and direction in relation to the work piece or machine coordinate system is defined and is applied in the case of a short circuit to the short-circuit point K.

The machining electrode is then moved along the withdrawal vector RV applied to the short-circuit point K. If the short-circuit should not yet be eliminated at the tip of the withdrawal vector RV, another movement along another section of withdrawal path R follows from the tip. This section extends parallel to the eroded machining path B and in opposite direction to the direction into which the machining electrode was moved during erosion in the eroded machining path B. Overall, this results in a withdrawal path R that is identical to the machining path B, but has been shifted in the space by the defined withdrawal vector RV.

Figure 4:
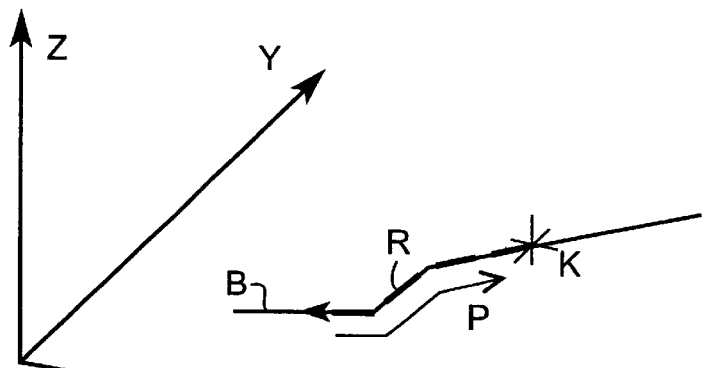
FIG. 4 shows a schematic view of a known "default" way of withdrawal.

FIG. 4 shows a schematic view of a known "default" way of withdrawal. The shown coordinate system also shows a machining path B. The arrow P indicates the processing direction. A short-circuit occurs at point K of the machining path B. In the case of a short-circuit, the machining electrode travels the machining path (path geometry) in reverse direction until the short-circuit is eliminated at some point of the machining path traveling in a reverse direction. This way of withdrawal does not depend on the fact of whether an offset plane has been defined or not.

Figure 5:
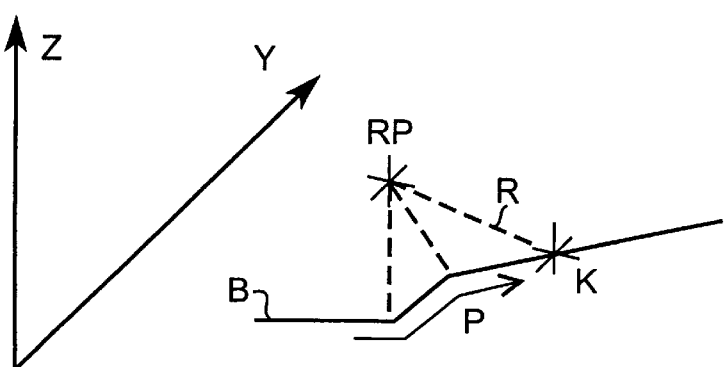
FIG. 5 shows a schematic view of a known "point" way of withdrawal.

FIG. 5 shows a schematic view of a known "point" way of withdrawal. A point RP is first defined here, whereby in the case of a short-circuit the withdrawal path R extends linearly from each short-circuit point K to this point RP.

For all mentioned ways of withdrawal, the machining electrode can be withdrawn from the work piece with an upward or downward movement that is generated at predetermined time intervals, i.e., by a small length so that the erosion particles created during the erosion process can be flushed out. The speed of the upward or downward movement is hereby substantially higher than the speed of the respective withdrawal movement. At certain time intervals, a so-called "double timer movement" with a substantially longer length can be incorporated; this movement ensures that the flushing agent can be easily flushed (which is not necessarily the case with simple timer movements). The length of repeated "double timer movements" can hereby be progressively increased.

After the process malfunction has been eliminated, the machining electrode is not directly guided along the eroded machining path but moves along the previously traveled withdrawal path R back towards the short-circuit point K.

The present invention has been described with reference to a preferred embodiment. However, it will be readily apparent to those skilled in the art that it is possible to embody the invention in specific forms other than as described above without departing from the spirit of the invention. The exemplary embodiment is illustrative and should not be considered restrictive in any way. The scope of the invention is given by the appended claims, rather than the preceding description, and all variations and equivalents which fall within the range of the claims are intended to be embraced therein.

What is claimed is:

1. A method for the controlled withdrawal movement of a machining electrode in an erosion device in the case of a process malfunction, comprising the steps of:

moving the machining electrode backward in a first way of withdrawal along a previously traveled machining path, and simultaneously moving the machining electrode in a second way of withdrawal along a withdrawal vector defined in relation to the previously traveled machining path, wherein a direction of the withdrawal vector at each point is adapted to the previously traveled machining path.

2. The method as claimed in claim 1, wherein in order to adapt the withdrawal vector, its length and direction are fixed in relation to a local coordinate system, and the local coordinate system is adapted locally in such a manner to each point of the machining path that one coordinate axis of the coordinate system is oriented tangentially to this point of the machining path.

3. The method as claimed in claim 2, wherein a second coordinate axis of the local coordinate system is oriented along a normal vector of an offset plane.

4. The method as claimed in claim 2, wherein different withdrawal vectors are associated by sections with the machining path.

5. The method as claimed in claim 2, wherein a fixed rotation of the electrode in relation to the local coordinate system is determined additionally for the withdrawal vector.

6. The method as claimed in claim 1, wherein for purposes of eliminating the process malfunction, before and/or during the withdrawal movement, supplementing measures for eliminating the process malfunction are performed.

7. The method as claimed in claims 6, wherein the supplementing measures include changing process parameters.

8. The method as claimed in claim 7, wherein the process parameters include machining current, frequency and flushing.

9. The method as claimed in claim 1, wherein the machining electrode is withdrawn at different speeds along the two ways of withdrawal.

10. The method as claimed in claim 1, wherein during the course of the withdrawal movement, the speed of the machining electrode along one or both ways of withdrawal and possibly also the rotation speed of the machining electrode is changed.

11. The method as claimed in claim 1, wherein after the process malfunction is eliminated, the machining electrode is moved backward along the traveled withdrawal path to the point where the process malfunction first occurred.

12. The method as claimed in claim 1, wherein the withdrawal movement is followed by a following withdrawal using one or more of the following ways of withdrawal: default, point, fixed vector.

13. The method as claimed in claim 12, wherein the time at which the machining electrode was moved over the entire length of the withdrawal vector is chosen as the onset time for the following withdrawal.

14. The method as claimed in claim 1, wherein various ways of withdrawal or heir combinations are associated with sections of the machining path.

15. The method as claimed in claim 1, wherein the machining steps required for the tool machining are controlled by a control program, whereby geometrical data and machining parameters are entered separately, the control program is created by linking the geometrical data with certain machining parameters, and the way of withdrawal is associated with the machining parameters.

* * * * *